UNITED STATES PATENT OFFICE 2,394,258

AZO DYESTUFFS

Robert P. Parker, Somerville, and John J. Denton, Bound Brook, N. J., assignors to American Cyanamid Company, New York, N. Y., a corporation of Maine No Drawing. Application July 3, 1944,
Serial No. 543,435

12 Claims. (Cl. 260—203)

This invention relates to a new series of azo dyestuffs derived from 4'-alkenyloxy-4-aminodiphenylamines having the formula:

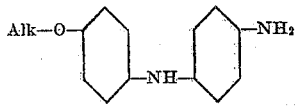

in which Alk is an alkenyl radical.

The preferred azo dyestuffs of the present invention are those in which the diazotized bases are coupled with ice-color coupling components. Few aromatic amino compounds have been known which produce on diazotization and coupling with an ice-color coupling component strong blue to violet shades with satisfactory fastness properties. It is one of the principal objects of the present invention to produce a new series of bases and ice-colors derived therefrom which will have these desirable shades. It is a further object of the invention to make available new blue to violet pigments or dyes which exhibit superior fastness properties such as fastness to light, heat, washing and retained brightness.

The bases from which the azo dyestuffs of the present invention are formed are not claimed per se in the present application but form the subject matter of our copending application Serial No. 543,434, filed July 3, 1944. In general these bases may be prepared by reacting 4'-hydroxy-4-nitro diphenylamine or its 2-sulfonic acid derivative with an alkenyl ester such as the chloride, bromide or iodide, preferably in the presence of an acid binding agent. Alkali-metal alkoxides and hydroxides are the preferred acid binding agents but other alkaline agents such as alkaline earth metal hydroxides, alkali metal and alkaline earth metal carbonates may be equally well used. The nitro group can then be reduced and if the 2-sulfonic acid derivative was used in the first place this group may be eliminated if desired either before or after reduction of the nitro group. The reduction may be carried out in alkaline medium or in acid medium and the pH of the reaction determines whether the compound is obtained in the form of free base or its salt.

Typical examples of the alkenyl groups which may be present in the compounds from which the azo dyestuffs of the present invention are prepared are allyl, 2-methylallyl (methallyl), 2-chloroallyl, 2-cyanoallyl, crotyl, 3,3-dimethylallyl, and 2-fluoroallyl.

In the diazotization of the bases used to produce the products of the present invention it is possible to produce two types of compounds. In general when higher temperatures and greater concentrations of bases and mineral acid are used with an excess of nitrite a N-nitroso derivative of the diazonium compound is produced. These derivatives usually produce duller and less desirable shades on coupling. The simple diazonium compounds which produce the more valuable, brighter and faster shades are obtainable by diazotizing at lower temperatures, with lower acid concentrations and controlled nitrite addition.

When the N-nitroso colors are obtained they may be transformed into the more desirable colors by hydrolysis which is best effected by heating in dilute solution with an alkaline agent such as soda ash. Reducing agents such as sodium sulfide, sodium bisulfite or their equivalents may be included to destroy nitric oxides as liberated.

In their diazotized form, the bases may be coupled either with or without a substrate to yield dyestuffs or pigments of great value because of their strength, variety of shade and fastness properties. In particular, however, the bases are important for the production of fast blue prints or dyeings upon cellulosic materials. These are produced in general by impregnating the cellulosic material in alkaline baths with appropriate ice-color coupling components and then printing solutions of the diazotized bases which have been buffered and thickened upon such prepared cloth, or by pad dyeing the prepared cloth in buffered solutions of the diazotized bases.

Solutions of the diazotized bases may also be treated with inorganic alkali metal salts or alkaline earth metal salts, or with mixtures of these salts together with appropriate inorganic metal salts whereupon the diazonium salts, or metal salt complexes of the diazonium salts are precipitated. These may be separated, dried, stored or blended with inorganic salts such for example as with sodium or potassium chlorides, sulfates, magnesium sulfate, aluminum sulfate and the like; the latter preferably being used in their partially dehydrated forms. Such products may be readily dissolved in water to yield solutions from which cellulosic materials which have previously been impregnated in alkaline grounding baths with appropriate ice-color coupling components may be suitably pad dyed or the solutions may be appropriately thickened and printed upon the prepared cellulosic fabrics.

The bases may also be converted into diazosulfonates which may be isolated from solution, dried, stored or they may be blended in the dry state with appropriate ice-color coupling components and oxidizing agents. Such blends may be incorporated into a printing paste, printed upon vegetable fibers and the pigment developed by treatment with steam.

The diazotized bases may be coupled with any ordinary coupling component. However, the advantages of the invention are more marked when the coupling is with ice-color coupling components rather than with coupling components containing solubilizing groups such as sulfonic groups or carboxylic groups. The most important group of ice-color coupling components are the arylides of 2-hydroxy-3-naphthoic acid which give the important fast blue to violet shades.

The dyestuffs of the present invention are not limited to the above and other ice-color coupling components may be used such as beta-naphthol, 8-amino-2-naphthol, 8-acetylamino-2-naphthol, benzoyl naphthols, pyrazolones and pyrazyl pyrazolones; hydroxy benzofluorenones; hydroxy derivatives of phenyl naphthylamines such as 7-hydroxy-1 - naphthyl - m - hydroxyphenylamine; particularly the various N-substituted amides such as arylides of 5, 6, 7, 8-tetrahydro-2-hydroxy-3-naphthoic acid, of 2-hydroxy-3-anthroic acid, of methyl and dimethyl salicylic acids, of hydroxy-carbazole carboxylic acids, of hydroxy benzocarbazole carboxylic acids, of hydroxy-benzoacridone carboxylic acids, of 3,7-dihydroxy-naphthalene-2,6-dicarboxylic acids, of hydroxy-dibenzofuran carboxylic acids, of hydroxy benzothiophene carboxylic acids, etc., and the arylides of acetoacetic acid, furoyl acetic acid, benzoyl acetic acid, terephthaloyl-bis-acetic acid and the like. The arylide group in the coupling component may be a simple aromatic group such as the radical of aniline, or of an aniline derivative, or of a naphthylamine, or it may be the radical of a heterocyclic amine, such as, e. g., of an amine of the benzothiazole series or of a diamine of the diphenylene oxide or diphenylene sulfone series.

The bases of the present invention also may be used in the preparation of water-soluble dyestuffs suitable for dyeing vegetable or animal fibers. In this case, a great many of the customary phenolic or aminic coupling components may be used. The coupling component, however, must carry at least one sulfonic group in case the diazo component has none. Illustrative examples of such coupling components include salicylic acid, resorcinol, m-phenylene diamine, the large number of naphthol-sulfonic acids, such as e. g., R-acid, G-acid, the Cleve's acids, J-acid, Gamma-acid, J-acid urea and J-acid imide, H-acid and many others. Pyrazolones such as sulfonic derivatives of 1-phenyl-3-methyl pyrazolone-5 also may be used.

The invention will be more fully illustrated in conjunction with the following examples which are meant to be illustrative only and not by way of limitation. All parts are by weight unless otherwise noted.

*Example 1*

4'-allyloxy-4-aminodiphenylamine hydrochloride

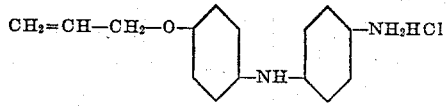

A mixture of 27 parts of 4'-allyloxy-4-nitrodiphenylamine, 125 parts 37% sodium sulfhydrate, and 79 parts of alcohol is stirred continually in a reaction vessel and heated under reflux for four hours. It is cooled and a copious precipitate of 4'-allyloxy - 4 - aminodiphenylamine forms when 100 parts of water is added slowly. This slurry is further diluted with 200 parts of water, and the solid is collected on a filter. After being washed free of mother liquor, the amine is isolated in the form of its hydrochloride by being dissolved in hot, dilute hydrochloric acid, the solution filtered, chilled, and the 4'-allyloxy-4-aminodiphenylamine hydrochloride salted out with sodium chloride.

*Example 2*

Eleven and one-tenth parts of 4'-allyloxy-4-aminodiphenylamine hydrochloride as obtained in Example 1 are slurried in 200 parts of water containing 48 parts of 17% hydrochloric acid. The slurry is kept at 15° C. while being diazotized slowly by dropwise addition of a solution of 3 parts of sodium nitrite in 44 parts of water. The resulting slurry is diluted with approximately 150 parts of water, heated to 50° C., treated with decolorizing charcoal, and filtered. The clear, red-orange solution resulting is chilled in an ice bath, and the diazonium chloride of 4'-allyloxy-4-amino diphenylamine is precipitated as an orange solid through addition of sodium chloride. It is filtered off and is dried at low temperature. It is readily soluble in water.

*Example 3*

A dry mixture is made from 3.3 parts of the diazonium chloride as prepared in Example 2 from 4'-allyloxy-4-aminodiphenylamine, 2 parts of magnesium sulfate dihydrate, and 1 part of anhydrous sodium sulfate.

Two parts of this dry mixture are dissolved in 25 parts of water and the solution is treated with 73 parts of suitable carbohydrate thickener. This thickened printing paste is printed from an engraved steel roll on cotton piece goods that have been previously impregnated with the anilide of 2-hydroxy-3-naphthoic acid in an alkaline grounding liquor. The printed stripe is dried at 65° C., is cleared in a hot dilute soda ash bath, is treated in ½% soap solution at 60° C., is rinsed and dried.

The pattern is printed a strong blue of greenish shade which shows superior fastness properties.

*Example 4*

4'-methallyloxy-4-nitrodiphenylamine

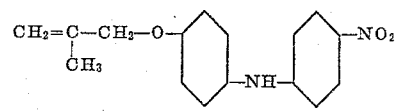

To a solution of 9.5 parts 95% sodium methylate and 34.5 parts 4'-hydroxy-4-nitrodiphenylamine in 197 parts of absolute alcohol is added 14.9 parts methallylchloride. The reaction mixture is heated under reflux for six hours. After heating it is cooled, and 150 parts of water is added to induce crystallization of the product. This cold slurry is then poured into 700 parts of water kept acidic to litmus. The solid is collected on a filter and the filtrate discarded. The damp solid is reslurried in water kept alkaline to phenolphthalein and the solid 4'-methallyloxy-4-nitrodiphenylamine is recollected on a filter, washed free of alkali and dried. After crystallization from dilute alcohol, its melting point is 80–82° C.

Example 5

4'-methallyloxy-4-aminodiphenylamine hydrochloride

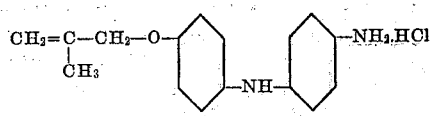

29.7 parts of 4'-methallyloxy-4-nitrodiphenylamine is suspended in 125 parts of 37% sodium sulfhydrate solution and 59 parts of ethyl alcohol and the whole refluxed with continuous agitation for a number of hours until reaction is complete. After the reaction mixture is cooled, the addition of a few parts of water causes the amine to solidify and results in a smooth slurry. This slurry is diluted with 200 parts of water, and the solid 4'-methallyloxy-4-aminodiphenylamine is collected on a filter and washed thoroughly with water containing sodium hydrosulfite. The amine is obtained in the form of its hydrochloride by dissolving in warm, very dilute hydrochloric acid, treating with decolorizing charcoal, filtering, cooling in an ice bath, and salting out with sodium chloride. The crystalline 4' - methallyloxy - 4-aminodiphenylamine hydrochloride which forms is collected on a filter and dried.

Example 6

A mixture of 11.6 parts of 4'-methallyloxy-4-aminodiphenylamine hydrochloride (as obtained in Example 5), 150 parts of water, and 48 parts of 17% hydrochloric acid is stirred and cooled to 15° C. and kept at that temperature while being diazotized with a solution of approximately 3.3 parts sodium nitrite in 49 parts of water. After diazotization is complete, the mixture is diluted with about 300 parts of water, warmed and stirred in a water bath to 60° C., and the solution is treated with charcoal and filtered. The filtrate which is clear and bright orange in color is chilled and stirred in an ice bath, and the diazonium chloride is salted out by the addition of sodium chloride. The diazonium chloride of 4'-methallyloxy-4-aminodiphenylamine is obtained in the form of a yellow-orange solid, which is collected on a filter and dried. It is readily soluble in water.

Example 7

A dry mixture is prepared from 52 parts of the diazonium chloride of 4'-methallyloxy-4-aminodiphenylamine, 23.3 parts of magnesium sulfate dihydrate and 11.7 parts of anhydrous sulfate.

When 2.0 parts of this mixture are converted to a printing paste and printed according to the procedure as described in Example 3 on cotton fabric previously impregnated with the anilide of 2-hydroxy-3-naphthoic acid and finished by the procedure described, a heavy blue of strong reddish shade and good fastness properties is obtained.

Example 8

10.2 parts of the sulfate salt of 4'-(allyloxy)-4-aminodiphenylamine are slurried in a mixture of 130 parts of water and 8.0 parts of 20% sulfuric acid. After stirring for ½ hour the temperature is adjusted to 15° C. and the slurry is diazotized by slow addition of 3.2 parts of sodium nitrite dissolved in 40 parts of water. The resulting solution is clarified and the chilled filtrate is treated dropwise with 10 parts sulfuric acid (1.84) and then 10 parts of anhydrous sodium sulfate are strewn in portionwise.

The orange, flaky precipitate of the diazonium acid sulfate of 4'-(allyloxy)-4-aminodiphenylamine is collected on the filter and is dried at low temperature.

Example 9

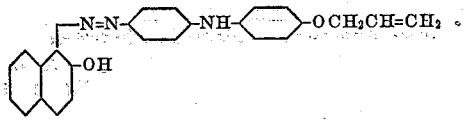

When 0.2 part of the dry diazonium acid sulfate obtained as described in Example 8, slurried in 2.5 parts methanol, is treated with a slurry of 2.0 parts of beta-naphthol in 2.5 parts of methanol and 3.0 parts of pyridine, a thick blue-black paste is obtained. This is heated for 10 minutes on a steam bath, is diluted with 200 parts of water and 20% sodium hydroxide is added until the resulting slurry is well alkaline to phenolphthalein paper. The dyestuff is flocculated by digestion on the steam bath, is filtered off, washed well with hot water, then with dilute hydrochloric acid, finally by hot water.

After drying, a deep blue pigment is obtained, insoluble in water.

Example 10

4.0 parts of the dry diazonium acid sulfate of 4'-(allyloxy)-4-aminodiphenylamine as obtained in Example 8 are intimately mixed with 2.2 parts magnesium sulfate dihydrate and 1.1 parts of anhydrous sodium sulfate.

This product is used to produce developed dyeings on cotton fabric by the following procedure:

Cotton fabric is treated in alkaline grounding baths comprising: 5 parts of ice color coupling component, 5 parts of methanol, 20 parts of 20% sodium hydroxide solution and 470 parts of water. The treated cloth is passed between squeeze rolls and is immediately dried at 65° C.

5.0 parts of the fabric so treated is entered into dye baths containing 0.5 part of the above dry blended mixture dissolved in 250 parts of water and while the fabric is efficiently agitated 5 parts of 20% sodium acetate solution is run in.

When full color development is attained, the fabric is rinsed, is cleared at 70° C. in an alkaline solution (3% soda ash and 2% sodium hydroxide) for 2 minutes, treated at 70° C. in a ½% soap solution, rinsed in fresh water and dried.

The colors obtained with various ice color coupling components are as follows:

| Ice color coupling component | Color |
| --- | --- |
| 2-hydroxy-3-naphthoic acid anilide | Green-blue. |
| 2-hydroxy-3-naphthoic acid-(2'-methylanilide) | Blue. |
| 2-hydroxy-3-naphthoic acid-(2'-ethoxyanilide) | Navy blue. |
| Bis-(acetoacetic)-o-tolidide | Yellow-brown. |
| 2-hydroxy-3-naphthoic acid-(4'-chloroanilide) | Blue. |
| 2-hydroxy-3-naphthoic acid-(3'-nitranilide) | Green-blue. |
| 2-hydroxy-3-anthracene carboxylic acid-(2'-methylanilide) | Dark green. |
| 2-hydroxy-3-carbazole carboxylic acid-(2'-methylanilide) | Chocolate. |

Example 11

1.0 part of the dry blended mixture made in Example 10 is dissolved in 29 parts of water and the solution is thickened with 70 parts of a starch paste. Cotton piece goods previously impregnated with the anilide of 2-hydroxy-3-naphthoic acid in alkaline solution are printed and the print is finished as described in Example 3.

The pattern is printed a bright blue of greenish shade.

Example 12

The dry, blended mixture of the diazonium chloride of 4'-(methallyloxy)-4-aminodiphenylamine as made in Example 7 is used to produce developed dyeings on cotton fabric previously impregnated with ice color coupling components by the procedure as described in Example 10. The colors produced are listed below:

| Ice color coupling component | Color |
| --- | --- |
| 2-hydroxy-3-naphthoic acid anilide | Navy blue. |
| Bis-(acetoacetic)-benzidide | Dark tan. |
| 2-hydroxy-3-naphthoic acid-(2'-methoxyanilide) | Bluish black. |
| 2-hydroxy-3-naphthoic acid-(2'-methyl-4'-chloroanilide) | Reddish blue. |

Example 13

4'-(2''-chloroallyloxy)-4-nitrodiphenylamine

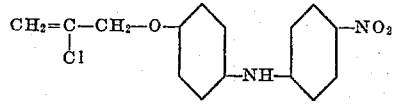

A solution of 240 parts of 95% ethanol, 6.4 parts of powdered sodium hydroxide, 34.5 parts of 4'-hydroxy-4-nitrodiphenylamine and 17.5 parts of 2-chloroallyl chloride is heated under gentle reflux for five hours. The solution is poured onto 700 parts of water, and a golden yellow solid separates out. This solid is collected on a filter and dried. The product, 4'-(2''-chloroallyloxy) - 4 - aminodiphenylamine crystallized from methyl alcohol melts at 82–84°. This product shows the phenomenon of existing in two forms, namely, a yellow form and a red form.

Example 14

4'-(2''-chloroallyloxy)-4-aminodiphenylamine hydrochloride

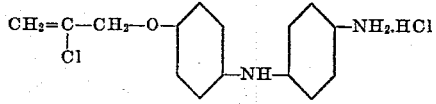

22.2 parts of iron powder, 240 parts of water, one part of glacial acetic acid and a pinch of "Gardinol" are charged in the reaction vessel and the temperature is raised to 75° C. At this temperature 12.2 parts of 4'-(2''-chloroallyloxy)-4-nitrodiphenylamine are added and the mixture is warmed in a water bath at 99° C. for five hours. After cooling, the mixture is filtered and the iron sludge is extracted with 150 parts of acetone. The acetone solution is clarified by filtration with charcoal. The clear acetone solution is cooled and when water is added the free base precipitates out as an oil. This is extracted with ether, and the dihydrochloride of 4'-(2''-chloroallyloxy) - 4 - aminodiphenylamine is precipitated from this ether solution by the addition of dry hydrogen chloride. When purified by crystallization from dilute hydrochloric acid, the monohydrochloride salt is produced which melts at 190–191.5° C.

Example 15

3.5 parts of 4'-(2''-chloroallyloxy)-4-aminodiphenylamine hydrochloride are dissolved in a solution of 12 parts of 17% hydrochloric acid in 35 parts of water, and the resulting solution is quickly iced to 15° C. A solution of 0.83 part of sodium nitrite in 12 parts of water is added slowly to this solution, and the whole is stirred until the diazotization is complete. The solution is clarified by filtration at 40° C. with diatomaceous earth. The filtrate is cooled and sodium chloride is added. The diazonium chloride of 4'-(2''-chloroallyloxy)-4-aminodiphenylamine precipitates as an oily solid which after separation and drying becomes friable. It may be rapidly dried and solidified by intimately mixing it with an equivalent weight of a mixture of magnesium sulfate-sodium sulfate (two parts magnesium sulfate dihydrate to one part anhydrous sodium sulfate). The resulting blended product is readily soluble in water.

Example 16

One part of the blended diazonium chloride as prepared in Example 15 is dissolved in 300 parts of water and then 5.0 parts of cotton piece goods previously impregnated in an alkaline grounding bath of the ortho-phenetidide of 2-hydroxy-3-naphthoic acid are entered to the dye bath and are well stirred for 10 minutes. The goods are removed, rinsed in fresh water, cleared in boiling dilute soda ash bath, treated in ½% soap solution at 65° C., rinsed in fresh water and dried.

The cloth is evenly dyed a heavy shade of blue. When instead of the ortho-phenetidide of 2-hydroxy-3-naphthoic acid the anilide is employed in the above dyeing operation, the cloth is dyed a strong blue of redder shade.

Example 17

A printing paste is prepared by dissolving 2 parts of the blended diazonium chloride as obtained in Example 15 in 28 parts of water and adding 70 parts of suitable carbohydrate thickener. This print paste is printed from an engraved roll on cotton piece goods previously impregnated in an alkaline grounding liquor of the anilide of 2-hydroxy-3-naphthoic acid and the print is finished by the procedure of Example 3. The fabric is printed a strong blue of superior fastness properties.

We claim:

1. Azo dyestuffs having the general formula:

A—N=N—B in which A is the residue of a coupling component and B is the residue of a diazotized 4'-alkenyloxy-4-aminodiphenylamine.

2. Azo dyestuffs having the general formula:

A'—N=N—B in which A' is the residue of an ice color coupling component and B is the residue of a diazotized 4'-alkenyloxy-4-aminodiphenylamine.

3. Azo dyestuffs according to claim 2 in which the alkenyl radical is a hydrocarbon radical.

4. Azo dyestuffs according to claim 2 in which the alkenyl radical is a halogenated alkenyl radical.

5. Azo dyestuffs according to claim 2 in which the residue of an ice color coupling component is the residue of an arylamide of 2-hydroxy-3-naphthoic acid.

6. Azo dyestuffs according to claim 2 in which the residue of an ice color coupling component is the residue of an arylamide of 2-hydroxy-3-naphthoic acid and the alkenyl group is a hydrocarbon radical.

7. An azo dyestuff having the formula:

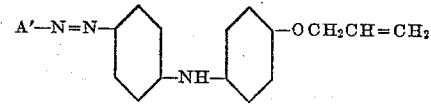

in which A' is the residue of an ice color coupling component.

8. An azo dyestuff having the formula:

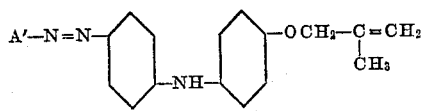

in which A' is the residue of an ice color coupling component.

9. An azo dyestuff having the formula:

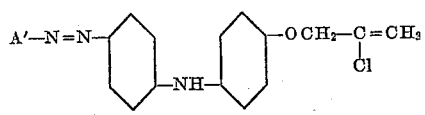

in which A' is the residue of an ice color coupling component.

10. Azo dyestuffs according to claim 7 in which the residue of the ice color coupling component is the residue of an arylamide of 2-hydroxy-3-naphthoic acid.

11. Azo dyestuffs according to claim 8 in which the residue of the ice color coupling component is the residue of an arylamide of 2-hydroxy-3-naphthoic acid.

12. Azo dyestuffs according to claim 9 in which the residue of the ice color coupling component is the residue of an arylamide of 2-hydroxy-3-naphthoic acid.

ROBERT P. PARKER.
JOHN J. DENTON.